United States Patent Office 2,971,894
Patented Feb. 14, 1961

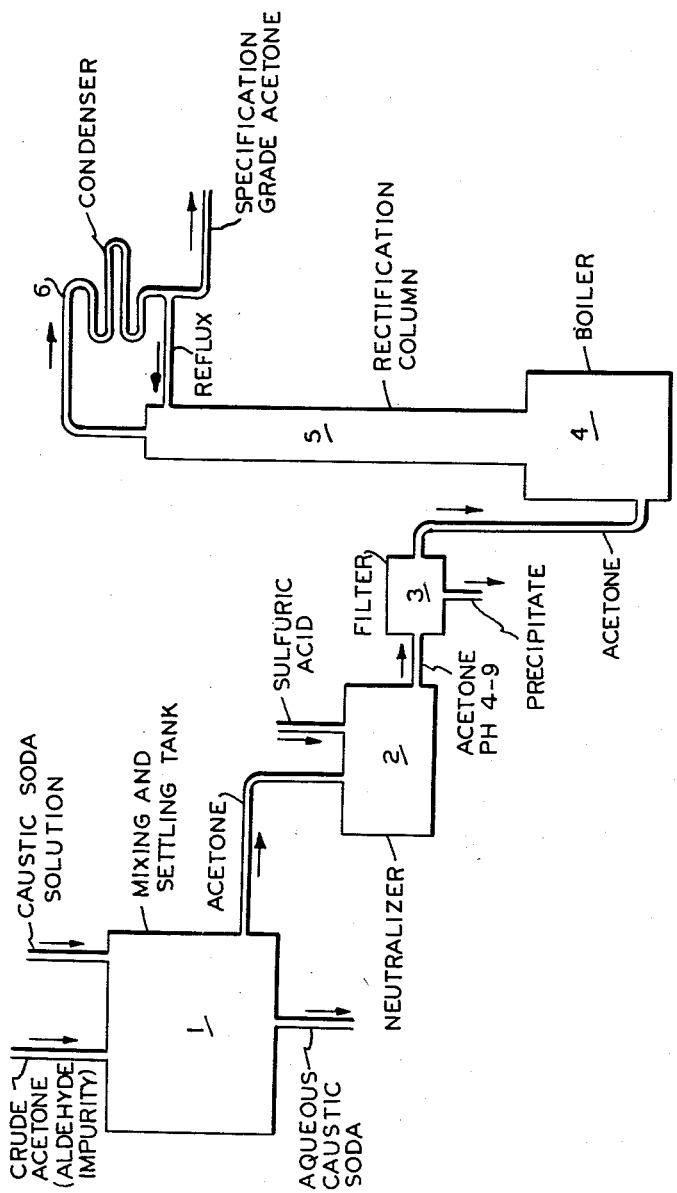

2,971,894

PROCESS FOR PURIFYING ACETONE

William T. Kendall, Florham Park, N.J., assignor to Allied Chemical Corporation, a corporation of New York Filed May 21, 1957, Ser. No. 660,483

6 Claims. (Cl. 202—57)

This invention relates to an improvement in the processes for treating a crude acetone containing aldehyde impurity, and which may also contain other carbonyl impurities, the total amount of such impurities being such that the acetone does not meet the potassium permanganate test for specification grade acetone.

Crude acetone prepared by processes such as the catalytic oxidation of isopropylalcohol, or the oxidation of cumene with air and decomposition of the cumyl hydroperoxide to form acetone and phenol, is generally recovered as a material containing about 70% or more acetone. This crude acetone contains carbonyl impurities, including aldehyde, which are particularly difficult to remove from the acetone and yet if present in even very small amounts make the acetone unsuitable for numerous uses. Certain tests, therefore, have been set up which must be met by an acetone to be marketed as a specified grade of acetone, for example as reagent or as CP acetone. One such test is the potassium permanganate test, which is sensitive to the presence of very small amounts of the above type of impurities in the acetone.

Distillation of the crude acetone to recover a highly pure product involves difficulties and is costly because of the high reflux ratios required and low yields of pure product. It has been proposed to employ a water extractive distillation for the recovery of purified acetone. In such process, the crude acetone is distilled and the vapors are washed by counter-current contact with water to carry the acetone into the distillation bottoms dissolved in water while impurities are carried overhead as distillate.

To improve the economics of this water extractive distillation process, it has been proposed to treat the crude acetone with aqueous caustic solution under conditions such that after being mixed for a suitable period they will layer separate into an upper acetone layer and a lower aqueous layer. The acetone layer is withdrawn and subjected to the water extractive distillation. By a second distillation, of the aqueous bottoms from the water extractive distillation, a purified acetone is obtained as the distillate product separated from water withdrawn as bottoms of this distillation. This prior art process has as its objective a lessening in the amount of water which must be supplied to the water extractive distillation step and thus decrease its cost. It still requires, however, a costly water extractive process to recover an aqueous solution of the acetone which must be then treated in a second distillation step with conventional fractionation of the vapors in contact with a reflux of liquid acetone in order to recover from the aqueous solution a specification grade acetone having a permanganate time of at least 2 hours.

I have now discovered that by adding acid to the caustic treated acetone to bring its pH to 4–9 and then distilling the acetone without water extraction, a specification grade acetone as respects the permanganate test is obtained as the overhead distillate.

My invention is characterized by adding sufficient acid to the crude acetone after separation from the caustic solution to bring the acetone to a pH of 4–9 and distilling the thus treated acetone, taking overhead an acetone distillate which passes the permanganate test. This distillation is best carried out with rectification of the vapors by contact with a reflux of liquid condensate from the vapors. Liquid condensate of the rectified vapors is taken off as a purified acetone product which meets the permanganate test for specification acetone.

In thus treating the crude off-grade acetone in accordance with my invention, it is preferred to add to the caustic treated acetone an amount of acid such that its pH is brought to 6–8. Any of the inorganic or organic acids non-reactive with acetone and of suitable acid strength to bring the acetone to the required pH, may be employed in practicing my invention.

In treating the crude acetone with caustic solution, any of the caustic alkali solutions in the concentrations and under the conditions of treatment of the acetone with the caustic solutions known to the art to be suitable for this treatment of the crude acetone, may be employed in practicing my invention.

I prefer to treat the crude acetone containing 70% or more of acetone with a 30%–50% aqueous caustic alkali solution, e.g. caustic soda or caustic potash solutions, at about atmospheric temperatures of 15°–35° C. for about 5 mins. to 30 mins. It is known that acetone treated with caustic alkali solutions tends to react to form other compounds, and increasingly greater amounts of the acetone react as the concentration of caustic solution and time of contact is increased and as the temperature of the contact is raised. Best practice, therefore, utilizes the lower values of these ranges for the concentration of the caustic solution and time of treatment to minimize the loss of acetone. By maintaining the crude acetone in intimate mixture for about 5 to 15 minutes with a 30%–40% caustic alkali solution in water amounting to about 10% to about 20% by volume of the crude acetone, surprisingly high yields of specification grade acetone having a permanganate time greater than 2 hours, are obtained by my process. More caustic solution than this may be used, up to 30% by volume of the crude acetone, but for especially high yields of purified acetone it is important to employ the stated times of contact and concentration of the aqueous caustic alkali.

As to the acid employed for neutralizing the caustic in the acetone after separation from the caustic soda solution with which it has been treated, I prefer to employ the inorganic acids of low volatility which in the substantially anhydrous condition boil at temperatures substantially higher than the boiling point of acetone. By using these acids, any free acid present in the acetone will be left in the residue of its distillation rather than being carried overhead into the distillate of purified acetone. Accordingly, I prefer to use sulfuric or phosphoric acid. On the other hand, hydrochloric acid may be employed. When such an acid of high volatility is employed, the amount added should not be in excess of that required to neutralize the acetone, or sufficient water should be present in the distillation to carry the hydrochloric acid into the residue, unless the acetone distillate freed of carbonyl impurities is to be further treated to remove hydrochloric acid which has been carried into the distillate.

The neutralization of the acetone produces a white, gelatinous precipitate. This generally is removed before the treated acetone is distilled, particularly when a continuous distillation column is used to avoid the precipitate accumulating in the column to interfere with its operation.

The accompanying drawing illustrates the several steps of the process of this invention.

With reference to the drawing, a crude acetone containing aldehyde impurity is mixed with caustic soda solution in a mixing and settling tank 1. The resulting two phase mixture is allowed to separate and the acetone phase is withdrawn separated from the lower, aqueous caustic soda phase. This acetone is passed into a neutralizer 2 where it is mixed with sufficient sulfuric acid to bring the acetone to a pH of 4–9. The small amount of precipitate formed as a result of this neutralization is removed from the acetone in filter 3 before passing the acetone to a boiler 4. This boiler is provided with a rectifying column 5 and a condenser 6. The acetone is distilled and the evolved vapors are condensed. A portion of the condensate is returned to the top of rectifying column. Another portion of the condensate is withdrawn as the specification grade acetone product of my process.

The following example illustrate a preferred embodiment of my invention. In this example all parts are by volume: A crude acetone was recovered by distillation of a product prepared by oxidizing cumene with air to cumyl hydroperoxide and decomposing the hydroperoxide with sulfur dioxide to form acetone and phenol. This crude acetone contained sufficient carbonyl impurities, including aldehyde, so that the acetone failed to pass the permanganate test, having a permanganate time less than 10 secs.

Three hundred volumes of the crude acetone were mixed with 30 volumes of a 30% caustic soda solution, and the mixture stirred at high speed to maintain the acetone intimately mixed with the caustic solution for 5 mins. at 23° C. The stirring was then discontinued and the mixture allowed to separate into two layers. The top acetone layer was separated from the bottom aqueous caustic soda layer. The acetone layer had a pH of 11. To it, 1.6 volumes of an 0.1064 N sulfuric acid were added. This brought the acetone to pH 7. A small amount of a white, gelatinous precipitate formed and was filtered from the solution.

The acid treated acetone was then distilled through a rectification column provided at its bottom with a boiler, into which the acetone was introduced, and a condenser for the vapors leaving the top of the column. A reflux of condensate from the condenser was returned to the top of the column. Another portion of this condensate was withdrawn as distillate product in a ratio of reflux to withdrawn product of 2/1. With temperatures in the top of the column rising to 56° C., 97.5 volumes of a purified acetone distillate were obtained from 100 volumes of the caustic treated and neutralized crude acetone supplied to the distillation. Allowing for hold-up in the column, at the end of the distillation more than 97.5% of the acetone supplied to the distillation was recovered as a specification grade product with a permanganate time greater than 2 hours. The analytical procedure used for determining potassium permanganate time, was that disclosed in Kirk-Orthmer, vol. 1, page 92 (1947).

I claim:

1. In the process wherein a crude liquid acetone containing aldehyde impurity is treated with aqueous caustic solution, the thus treated acetone is layer separated from the caustic solution and is distilled to recover a purified liquid acetone, that improvement which comprises adding acid to the liquid acetone, after separation from the caustic solution and before distilling it, to bring the acetone to a pH of 4–9 and thereafter distilling the thus treated acetone, separated from the caustic solution, with rectification of the vapors by contact with a reflux of liquid condensate from the vapors and condensing thus rectified vapors as the purified acetone distillate product of the distillation, which meets the permanganate test for specification acetone.

2. The process of claim 1 in which the crude liquid acetone is treated with the aqueous caustic solution at about atmospheric temperatures of 15°–35° C.

3. The process of claim 2 in which the crude acetone is treated with a 30%–50% aqueous caustic alkali solution at about atmospheric temperatures of 15°–35° C. for about 5 minutes to 30 minutes, and adding to the thus treated acetone separated from the aqueous caustic solution an inorganic acid of low volatility which, in the substantially anhydrous condition, boils at a temperature substantially higher than the boiling point of the acetone, to bring the acetone to a pH of 4–9.

4. The process of claim 3 in which the inorganic acid is added in amount sufficient to bring the acetone to a pH of 6–8.

5. The process of claim 3 in which the inorganic acid is sulfuric acid.

6. The process of claim 3 in which the crude acetone is maintained in intimate mixture for about 5 minutes to 15 minutes with a 30% to 40% aqueous caustic alkali solution amounting to about 10% to about 20% by volume of the crude acetone.

References Cited in the file of this patent

UNITED STATES PATENTS

| | | |
|---|---|---|
| 2,389,172 | Van Der Hoeven et al. | Nov. 20, 1945 |
| 2,485,329 | Steele et al. | Oct. 18, 1949 |
| 2,575,244 | Carlson et al. | Nov. 13, 1951 |
| 2,614,072 | Carlson et al. | Oct. 14, 1952 |
| 2,662,848 | Emerson et al. | Dec. 15, 1953 |
| 2,840,515 | Mora | June 24, 1958 |